United States Patent [19]
Matsumoto et al.

[11] Patent Number: 5,239,219
[45] Date of Patent: Aug. 24, 1993

[54] ELECTROMAGNETIC VIBRATING APPARATUS

[75] Inventors: Eiji Matsumoto; Noritoshi Oshima, both of Kitakyushu, Japan

[73] Assignee: Murakami Seiki Mfg., Co. Ltd., Fukuoka, Japan

[21] Appl. No.: 646,738

[22] PCT Filed: May 28, 1990

[86] PCT No.: PCT/JP90/00685

§ 371 Date: Jan. 23, 1991

§ 102(e) Date: Jan. 23, 1991

[87] PCT Pub. No.: WO90/15004

PCT Pub. Date: Dec. 13, 1990

[30] Foreign Application Priority Data

May 31, 1989 [JP] Japan ................................ 1-140066

[51] Int. Cl.⁵ ............................ H02K 7/06; B65G 27/24
[52] U.S. Cl. .......................... 310/81; 310/91; 310/15; 198/769
[58] Field of Search .................. 310/81, 89, 91, 67 R, 310/12, 13, 14, 15; 198/769, 770; 128/32, 34; 74/61; 173/162.1

[56] References Cited

U.S. PATENT DOCUMENTS

| | | | |
|---|---|---|---|
| 2,688,102 | 8/1954 | Jackson | 310/81 |
| 4,260,051 | 4/1981 | Burghart | 198/760 |
| 4,378,064 | 3/1983 | Brown | 198/769 |
| 4,587,863 | 5/1986 | Wadensten | 74/87 |
| 4,594,521 | 6/1986 | Schlicher | 310/15 |
| 4,740,946 | 4/1988 | Yumura et al. | 369/219 |
| 4,831,292 | 5/1989 | Berry | 310/15 |
| 4,838,771 | 6/1989 | Kikuchi | 417/417 |

*Primary Examiner*—Steven L. Stephan
*Assistant Examiner*—Matthew Nguyen
*Attorney, Agent, or Firm*—Jordan and Hamburg

[57] ABSTRACT

An electromagnetic feeder comprises a movable core secured to one mass of two masses connected by a resilient member, two fixed cores secured to the other mass so that said fixed cores are positioned on opposite sides of said movable core, two exciting coils wound about said two fixed cores, and a control circuit for alternately applying a phase-controlled current to said exciting coils, the mass to which said movable core is secured being connected to the object to be vibrated.

5 Claims, 7 Drawing Sheets

ELECTROMAGNETIC VIBRATING APPARATUS

FIELD OF THE INVENTION

The present invention relates to an electromagnetic vibrating apparatus for applying a vibrating force to objects to be vibrated, such as an electromagnetic feeder, an electromagnetic screen and the like.

BACKGROUND OF THE INVENTION

In an electromagnetic feeder used to convey materials or an electromagnetic screen used to sieve out materials, a trough or a sieving net is vibrated by AC excitation of an electromagnet.

More specifically, in these electromagnetic vibrating apparatuses, two masses are connected by a resilient member, and the resonant frequency of the structure is set to a level close to a power source frequency to enlarge a small electromagnetic force to a large one thereby applying strong vibrations to the trough or the sieving net.

A conventional electromagnetic feeder is excited with the number of vibrations having an audio frequency of a commercial power source, 50 Hz or 60 Hz. Therefore, in the case of the large type feeder, vibrational noises are violent and unpleasant, producing an environmental problem. Furthermore, as to the vibrating force, in the conventional electromagnetic feeder, only half the generated attractive force is utilized, providing the electromagnetic feeder with an extremely low rate of efficiency. In the case of the small feeder, this poses no significant problem but, in case of the large feeder, with a large current flow, there is a correspondingly large energy loss.

SUMMARY OF THE INVENTION

The present invention has been achieved in view of the above-described problem, and has as its object to relieve noises and enhance efficiency.

In order to the aforesaid object, an electromagnetic vibrating apparatus of the present invention comprises a movable core secured to one of two masses connected by a resilient member, two fixed cores secured to the other mass so that said fixed cores are positioned on opposite sides of said movable core, two exciting coils wound about said two fixed cores, and a control circuit for alternately applying a phase-controlled current to said exciting coils. The mass to which said movable core is secured is connected to the object to be vibrated.

Thereby, the vibration frequency of the movable core, half of the power source frequency, is a low frequency of 25 to 30 Hz so that unpleasant noises caused by vibrations can be greatly reduced. In addition, the rigidity can be lowered as compared with that of prior art, and therefore, the apparatus can be reduced in weight. Furthermore, since the electromagnet portion can be made approximately half, the apparatus can be miniaturized. Moreover, since the current can be lowered appoximately half, energy savings result.

DESCRIPTION OF THE PREFERRED EMBODIMENT

The present invention will be described in detail hereinafter on the basis of embodiments shown in the drawings.

Figure 1:
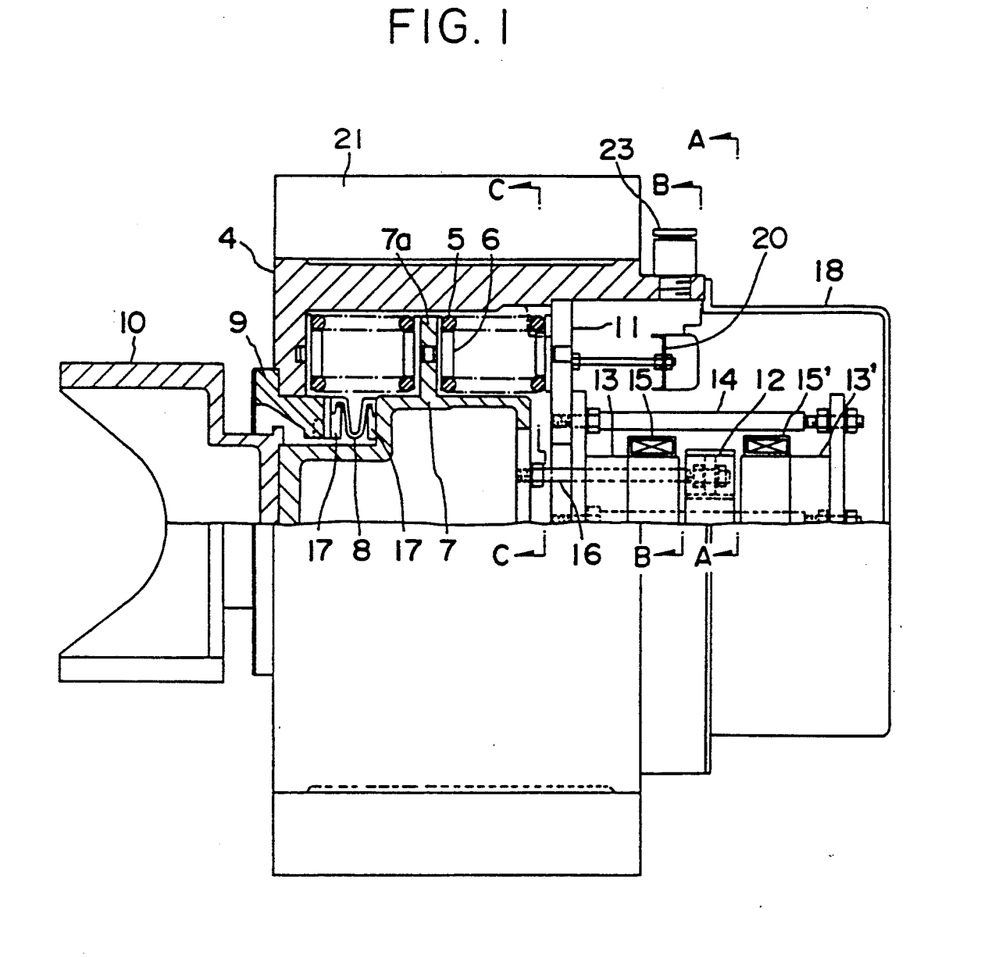
FIG. 1 is a partly cutaway side view showing an embodiment of the present invention.
Figure 2:
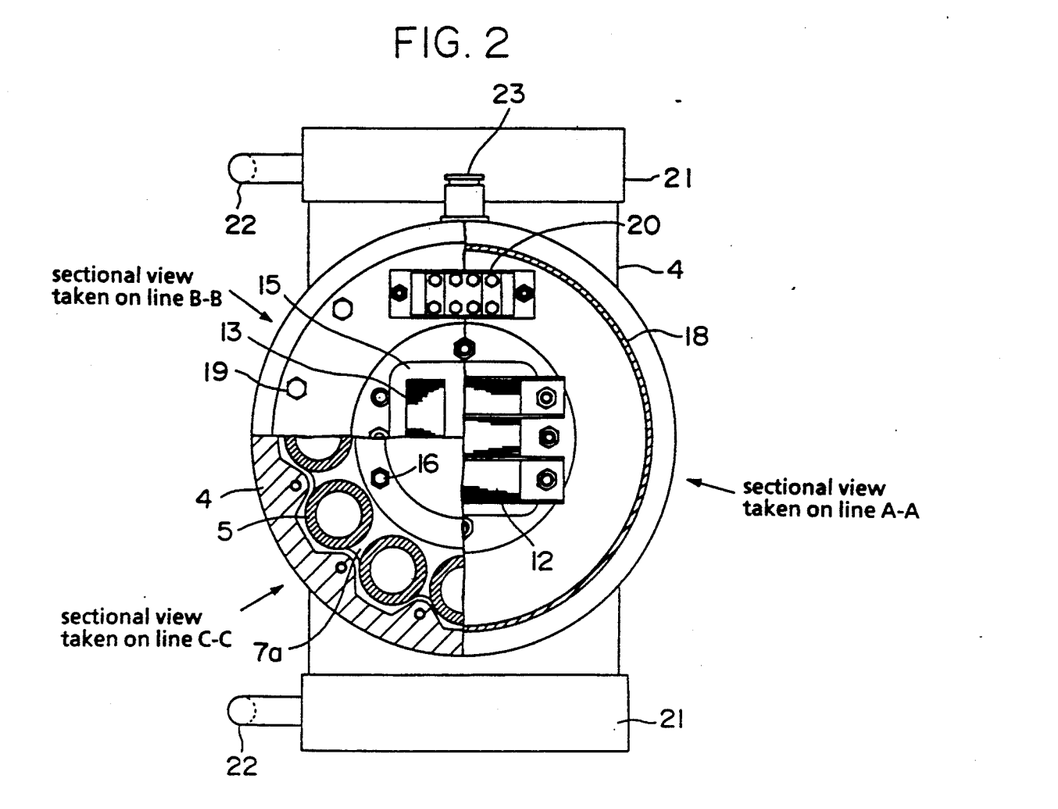
FIG. 2 is a composite sectional view taken on lines A—A, B—B, and C—C of FIG. 1.

In FIG. 1 and FIG. 2, reference numeral 4 designates a frame case for vibrating apparatus body, housing therein fixed cores 13, 13', a movable core 12 and a coil spring 5. The coil spring 5 is arranged on opposite sides of a flange 7a in the outer periphery of a spring support 7 for connecting the movable core 12 and a trough mounting fitting 10, the coil spring 5 being mounted by fastening a spring receiving ring 11 to the case 4 by means of a bolt 19. In this case, the coil spring 5 is compressed and fastened to prevent the case 4, the trough mounting fitting 10 secured to the spring support 7 and the trough 1 from being displaced or bent due to the compressive force in changing a relative position.

The fixed cores 13 and 13' are fixed to the spring receiving ring 11 by means of a stud 14. The movable core 12 can be easily adjusted by studs 14 and 16 so as to form an equally defined gap between the fixed cores 13 and 13'. Exciting coils 15 and 15' are secured by synthetic resins to the fixed cores 13 and 13'. Reference numeral 8 denotes rubber bellows, which are mounted between the spring support 7 and a fitting 9 by means of bolt using two keep fittings 17.

In the figures, reference numeral 6 designates a spring receiver; 18, a cover; 20, a terminal; 21, an auxiliary weight; 22, a hook; and 23, a cable drawing fitting.

Figure 3:
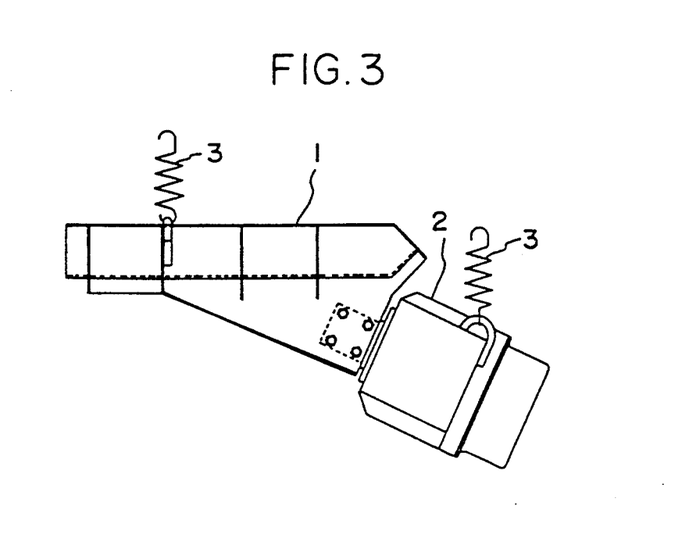
FIG. 3 is a side view showing the mounted state of a vibrating apparatus of the present invention.

The vibrating apparatus 2 constructed as described above is mounted on the trough 1 by the trough mounting fitting 10, as shown in FIG. 3, and is installed so that a load is carried by a hanging spring 3 while at the same time the apparatus can freely provide vibrations.

Figure 4:
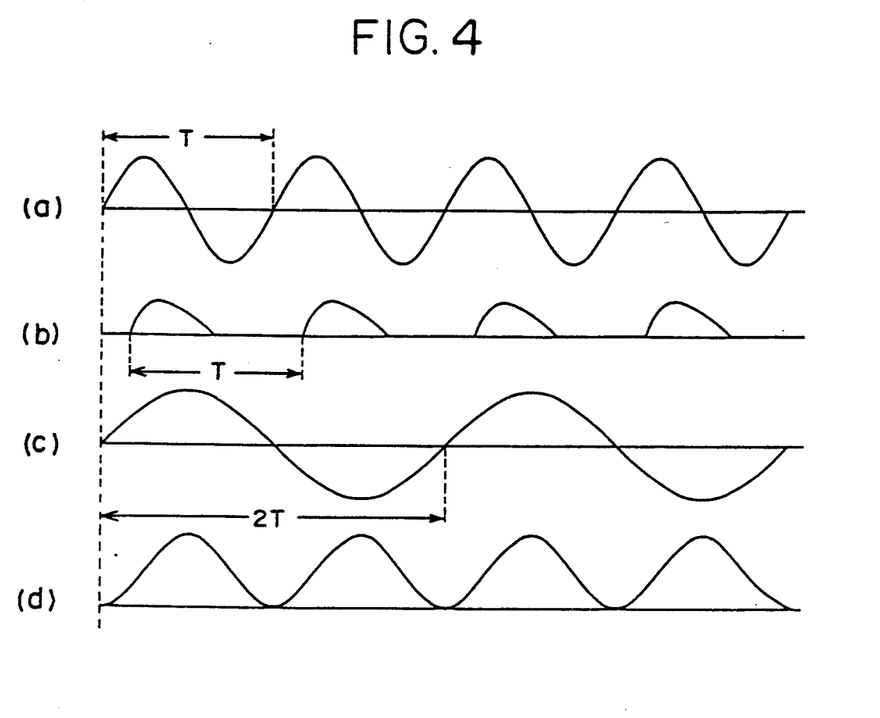
FIG. 4 is a waveform view showing the behavior of vibrations of the present invention.

FIG. 4(a) shows a power source voltage, and FIG. 4(b) shows a phase-controlled current. Current is made to alternately flow into the coils 15 and 15' by control, and when the current flows into the coil 15, the movable core 12 is attracted toward said coil 15. Then, current flows into the coil 15', and the movable core 12 is attracted toward the coil 15'. As a result, the attractive force is as shown in FIG. 4(c), and a period becomes twice that of the power source period. That is, the vibrational frequency is ½ of the power source frequency.

FIG. 4(d) shows a change of the attractive force in case of one coil in prior art. The vibrational frequency is the same as the power source frequency.

The attractive force according to the present example shown in FIG. 4(c) is given by $$F = F_1\sin\frac{\omega t}{2} + F_2\sin\omega t + F_3\sin\frac{3}{2}\omega t \quad (1)$$

The attractive force according to the conventional example shown in FIG. 4(d) is given by $$F = F_0 + \tfrac{1}{2} F_1\sin\omega t + F_2'\sin 2\omega t + F_3'\sin 3\omega t \quad (2)$$

where $\omega = 2\pi f$, and f: power source frequency.

In formula (1), since the resonant frequency is 1.05 to 1.1 times of $\omega/2$, $F_2$ et seq. can be disregarded. Accordingly, $$F = F_1\sin\frac{\omega t}{2} \quad (3)$$

In formula (2), since the resonant frequency is 1.05 to 1.1 times of $\omega$, $F_2'$ et seq. can be disregarded. $F_o$ indicates the force for displacing the fixed core to the coil side and constitutes no force for generating vibrations. Then, the following formula is obtained:

$$F = \tfrac{1}{2} F_1\sin\omega t \quad (4)$$

Figure 5:
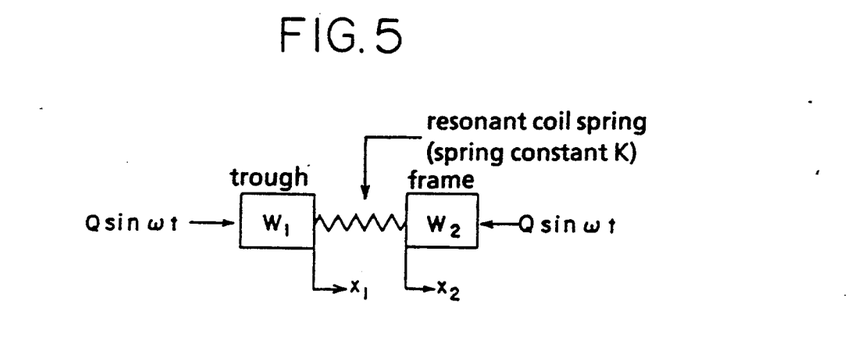
FIG. 5 is a schematic view of a vibrating system.

In FIG. 5, let $W_1$ be the weight on the trough side on which the movable core is mounted, $W_2$ be the weight on the frame side on which the fixed core about which a coil is wound is mounted, and K the spring constant of the resonant coil spring mounted therebetween, then the vibrating forces exerted on $W_1$ and $W_2$ are equal in absolute value and opposite in direction. Accordingly, the following formulae are established:

$$\frac{W_1}{g} \cdot \frac{d^2x_1}{dt^2} + (x_1 - x_2)K = Q\sin\omega t \quad (5)$$

$$\frac{W_2}{g} \cdot \frac{d^2x_2}{dt^2} + (x_1 - x_2)K = -Q\sin\omega t \quad (6)$$

where $x_1$ and $x_2$ designate the displacement from a position at which $W_1$ and $W_2$ stand still. When left side and right sides of the formulae (5) and (6) are added, then the following formula is given:

$$\frac{W_1}{g} \cdot \frac{d^2x_1}{dt^2} + \frac{W_2}{g} \cdot \frac{d^2x_2}{dt^2} = 0$$

If this formula is integrated, the following formula is given:

$$\frac{W_1}{g} \cdot \frac{dx_1}{dt} + \frac{W_2}{g} \cdot \frac{dx_2}{dt} = C_1$$

Since under the initial condition $t=0$, $dx_1/dt=0$ and $dx_2=0$, then $C_1=0$ results.

If the formula is further integrated, the following formula is given:

$$\frac{W_1}{g} \cdot x_1 + \frac{W_2}{g} \cdot x_2 = C_2$$

Since under the initial condition $t=0$, $x_1=0$ and $x_2=0$, then $C_2=0$ results. Therefore, the aforementioned formula will be expressed as follows:

$$W_1 x_1 + W_2 x_2 = 0$$

Thereby, $x_2$ is expressed by the following formula:

$$x_2 = -\frac{W_1}{W_2} x_1$$

Substituting this in formula (5) gives:

$$\frac{W_1}{g} \cdot \frac{d^2x_1}{dt^2} + \left(1 + \frac{W_1}{W_2}\right)Kx_1 = Q\sin\omega t$$

Solving this differential equation gives:

$$x_1 = \frac{Q}{\left(1 + \frac{W_1}{W_2}\right)K - \frac{W_1}{g}\omega^2} \sin\omega t$$

Let $a_1$ be the amplitude, $x_1 = a_1 \sin\omega t_o$. Therefore, $a_1$ is expressed by the following formula:

$$a_1 = \frac{Q}{\left(1 + \frac{W_1}{W_2}\right)K - \frac{W_1}{g}\omega^2}$$

Let $\omega_o$ be the resonant frequency, a denominator of the aforementioned formula is 0. Therefore, the following formula is established.

$$\left(1 + \frac{W_1}{W_2}\right)K - \frac{W_1}{g}\omega_0^2 = 0$$

Thereby, the following formula is established.

$$a_1 = \frac{Q}{\frac{W_1}{g}(\omega_0^2 - \omega^2)} = \frac{Q}{\frac{W_1}{g}\omega^2\left(\left(\frac{\omega_0}{\omega}\right)^2 - 1\right)}$$

$$Q = \frac{W_1}{g} a_1\omega^2\left(\left(\frac{\omega_0}{\omega}\right)^2 - 1\right)$$

The conveying speed is proportional to $a_1$. Since the acceleration $\alpha$ is $\alpha = a_1\omega^2$, then $a_1\omega = \alpha/\omega$. If the conveying speed is constant, i.e., $a_1\omega = $ constant, and $\omega$ is $\tfrac{1}{2}$, the acceleration $\alpha$ may be $\tfrac{1}{2}$. That is, if the vibration frequency is $\tfrac{1}{2}$, the force may be $\tfrac{1}{2}$. This means that the strength of the machine may be reduced, which reduces weight and is economical.

In order to make the conveying speed of the present invention same as that of prior art product, the acceleration may be set to $\tfrac{1}{2}$. In addition, since the maximum attractive force may be $\tfrac{1}{2}$ of prior art product from the formulae (3) and (4), an effective attraction area of an electromagnet may be $\tfrac{1}{2} \times \tfrac{1}{2} = \tfrac{1}{4}$.

Let n be the number of turns, it can be calculated by:

$$n = \frac{C_1 \cdot V}{4.44 \cdot f \cdot S \cdot B}$$

where f is the power source frequency, S is the effective area of an electromagnet, $C_1$ is the coefficient, and B is the magnetic flux density.

Since in the above-described formula, S is ½, the number of turns of the coil is four times. Accordingly, N=4n.

In the magnetic flux density, $B_g$ of the gap is constant, then,

Magnet motive force required for gap$(ATs) = \frac{1}{\mu} B_g \times g \times C_2$ where g is the conventional gap, $C_2$ the coefficient, and $\mu$ the magnetic permeability. The space gap g is twice that of the conventional product. That is, if a $\omega$=constant and $\omega$ is ½, the amplitude a is twice, and therefore the space gap is also twice.

Since ATs (Ampere Turns) consumed by the core is small, the maximum current is expressed by the following formula if counting is made with ATs of the gap.

When the effective area of the electromagnet is ¼, the electromagnet as a whole is less than ½ since, even if the fixed cores are two, the movable core is one, thus being miniaturized.

$$\text{maximum current} = \frac{ATs \text{ of gap}}{N} = \frac{(B_g/\mu) \times G \times C_2}{4n}$$
$$= \frac{(B_g/\mu) \cdot g \cdot C_2}{2n}$$
$$= \tfrac{1}{2} \times [\text{current of conventional apparatus}]$$

Figure 6:
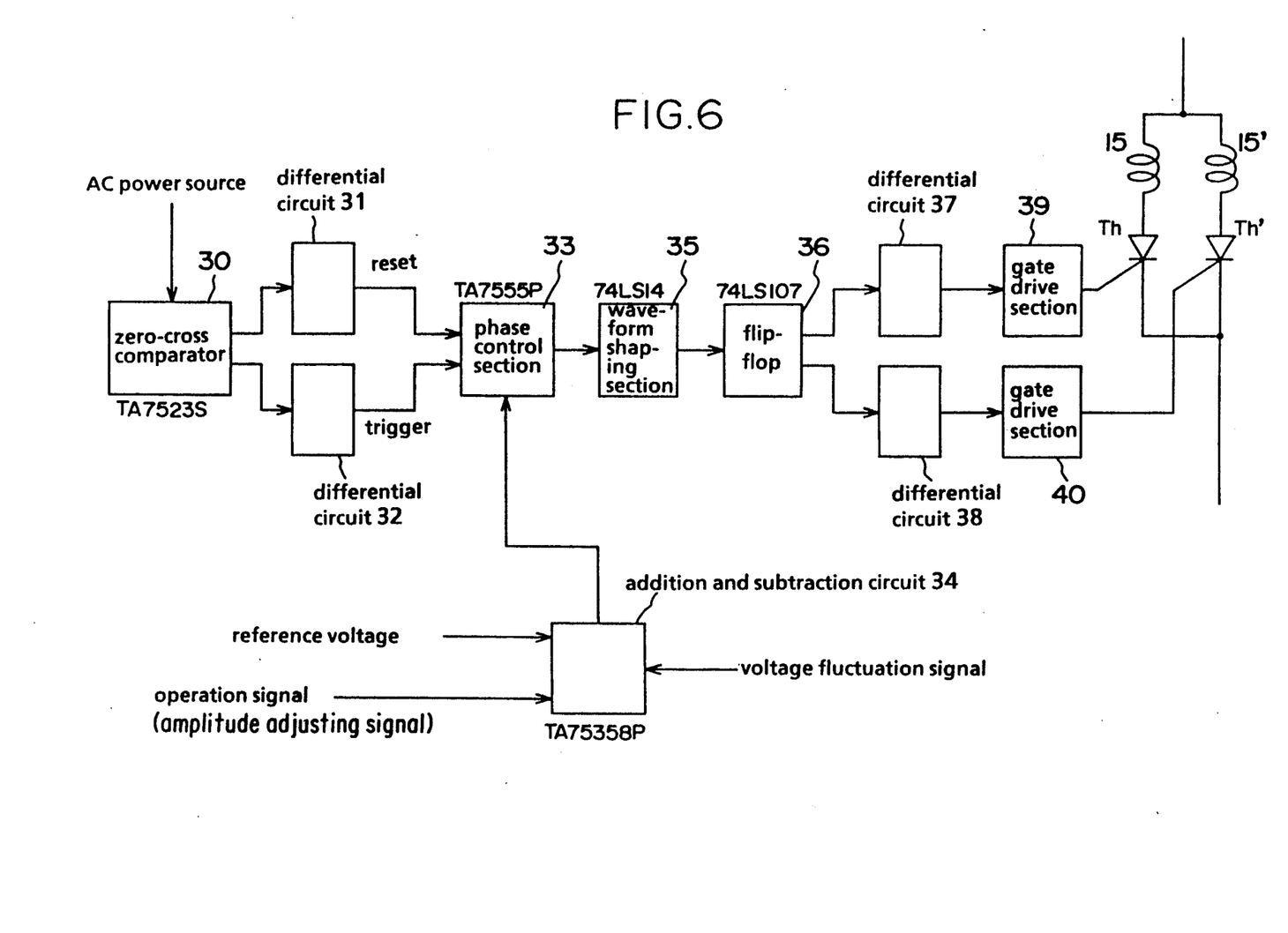
FIG. 6 is a circuitry representation showing the structure of an embodiment of a control circuit.

FIG. 6 shows an embodiment of a control circuit for an electromagnetic vibrating apparatus according to the present invention, and the operation thereof will be described hereinafter.

Figure 7:
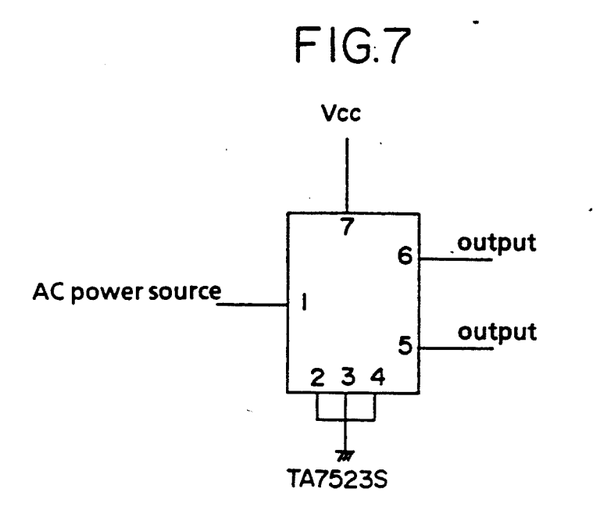
FIG. 7 is a circuit representation showing an IC constituting a zero-cross comparator.
Figure 8:
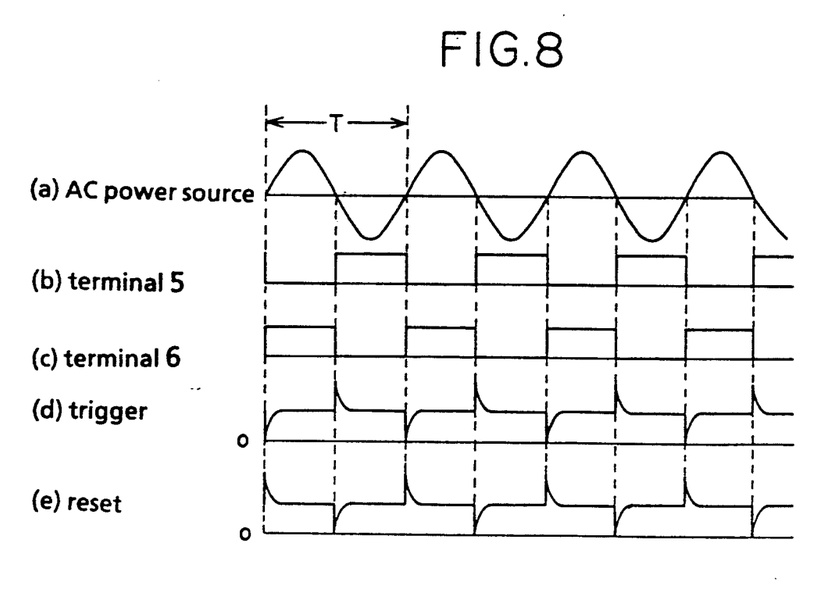
FIG. 8 is an operating waveform view showing the operation.

As shown in FIG. 7, a zero-cross comparator 30 comprises two output terminals, i.e., an output terminal 5 which assumes a low level at the moment an input passes through 0 V from a negative to a positive, and assumes a high level at the moment the input passes through from a positive to a negative, and an output terminal 6 for providing a signal opposite thereto. As shown in FIG. 8, during a positive half cycle of the power source voltage, the output voltage of terminal 5 is at a low level while the output voltage of terminal 6 is at a high level, whereas during a negative half cycle, the mode is reversed. The respective outputs are passed through differential circuits 31 and 32 to make negative pulses (see FIG. 8(d) and (e)). A pulse from the output terminal 5 is used as a trigger signal of a phase control section 33, and a pulse from the output terminal 6 is used as a reset signal. On the other hand, in the addition and subtraction circuit 34 shown in FIG. 6, an amplitude adjusting signal is subtracted from a reference signal, and a voltage varying signal is added thereto, from which the result is outputted. When the amplitude adjusting signal is small, the output voltage is high whereas when the amplitude adjusting signal is large, the output voltage is low. When the power source voltage is high, the output voltage increases whereas when the power source voltage is low, the output voltage decreases. The reason for this is that the amplitude of the electromagnetic feeder is relieved from having to vary in accordance to the variation from the power source voltage.

The phase control section 33 uses an IC for a timer, from which a high level signal is outputted, simultaneously with the input of the a trigger signal. Fall of output can be controlled when the reset signal is inputted or, in a suitable time within a positive half cycle of a power source period, by the voltage of the addition and subtraction circuit.

Figure 9:
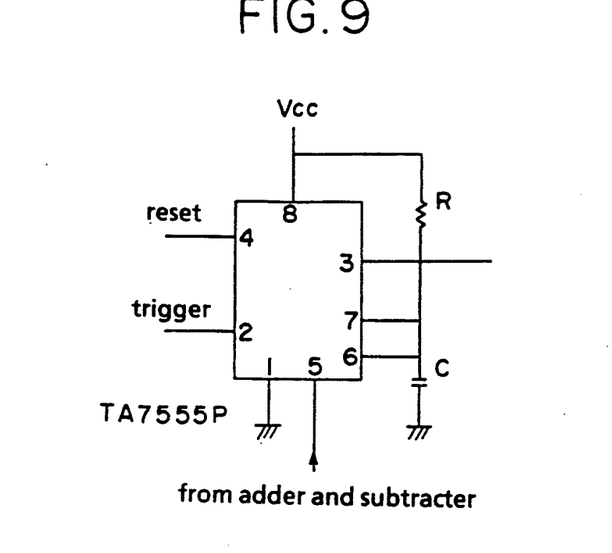
FIG. 9 is a circuit representation, showing an example of IC constituting a phase control portion.
Figure 10:
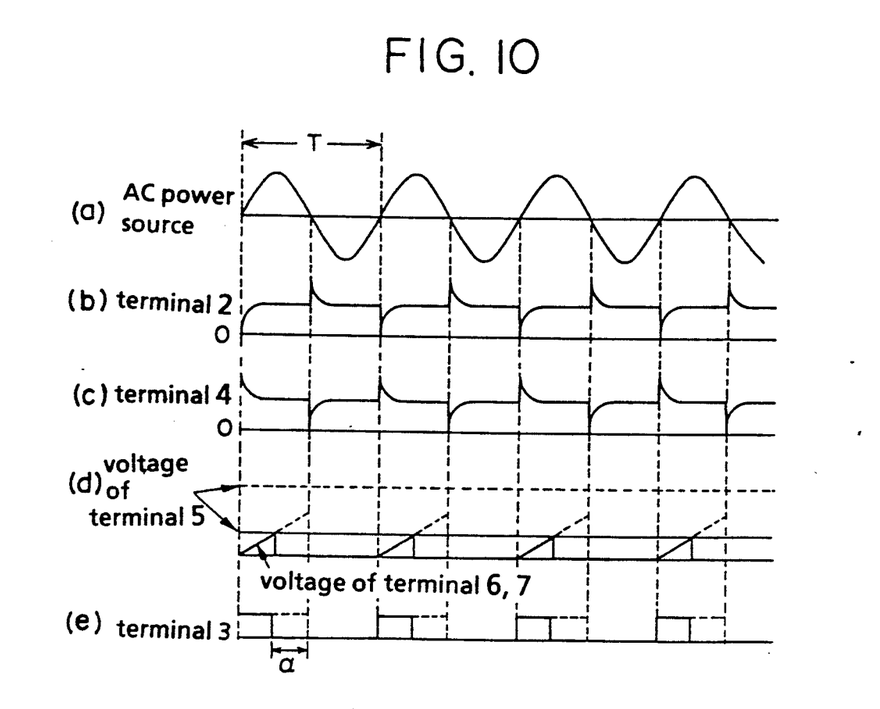
FIG. 10 is an operating waveform view of flip-flop.

The phase control section 33 can use an IC of TA7555P shown in FIG. 9. In the condition where the terminal 7 is interiorly grounded, at a moment a trigger signal is inputted into the terminal 2, the terminal 3 assumes a high level as shown in FIG. 10(e), and at the same time, the terminal 7 assumes a high impedance. Therefore, charging of capacitor C starts through resistor R from Vcc.

When the voltage value of terminal 6 coincides with that of terminal 5, a charge from the capacitor C is discharged through terminal 7 since this terminal 7 is interiorly grounded. At this moment, the output voltage of terminal 3 drops to a low level as shown in FIG. 10(e). The time from the input of a signal to assumption of a low level by terminal 3 can be freely controlled by the output voltage of the addition and subtraction circuit 33. When the input voltage of terminal 5 is high, the period of high level of output voltage from terminal 3 is long, and the amplitude of the electromagnetic feeder is small. When the input voltage of terminal 5 is low, the period of high level of output voltage from terminal 3 is short, and the amplitude of the electromagnetic feeder is large.

In the case where a charging voltage of the capacitor C does not reach the voltage value of terminal 5 within a positive half cycle period of the power source, the reset signal is inputted into terminal 4 at the moment when a change is made from positive to negative. Therefore, terminal 7 is interiorly grounded, the charge of the capacitor C is discharged, and at the same time, terminal 3 drops to a low level.

The waveform shaping section 35 shown in FIG. 6 is to adjust the voltage level for transmitting a signal of approximately 12 V from the previous stage to a flip-flop 36 in the subsequent stage and put the waveform in order. Two inverters within the IC of 74LS14 are used in series.

Figure 11:
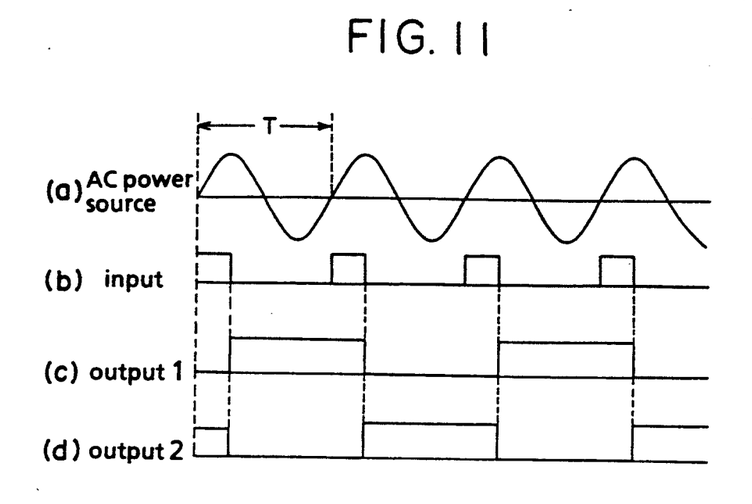
FIG. 11 is a diagram of two outputs operated with an input.

A flip-flop 36 is provided to toggle one input and two outputs. As shown in FIG. 11, two outputs are operated mutually opposite to one other for every fall of an input. Accordingly, the output frequency is ½ of the input frequency, and the period is twice as long.

Differential circuits 37 and 38 convert a rising portion of a rectangular wave outputted from a flip-flop 36 into a sharp pulse to supply it to gate drive sections 39 and 40 in the next stage.

The gate drive sections 39 and 40 are comprised of a transistor and a pulse transformer (which are not shown), in which a pulse from the preceding stage is amplified to induce a pulse-like voltage in the secondary of the pulse transformer, and a current is made to flow into gates of thyristors Th and Th' to turn on said thyristors Th and Th'.

As described above, as shown in FIG. 12, the thyristors Th and Th' are alternately and repeatedly turned on and off at a frequency which is ½ of the power source frequency to flow current into the coils 15 and 15'.

Figure 12:
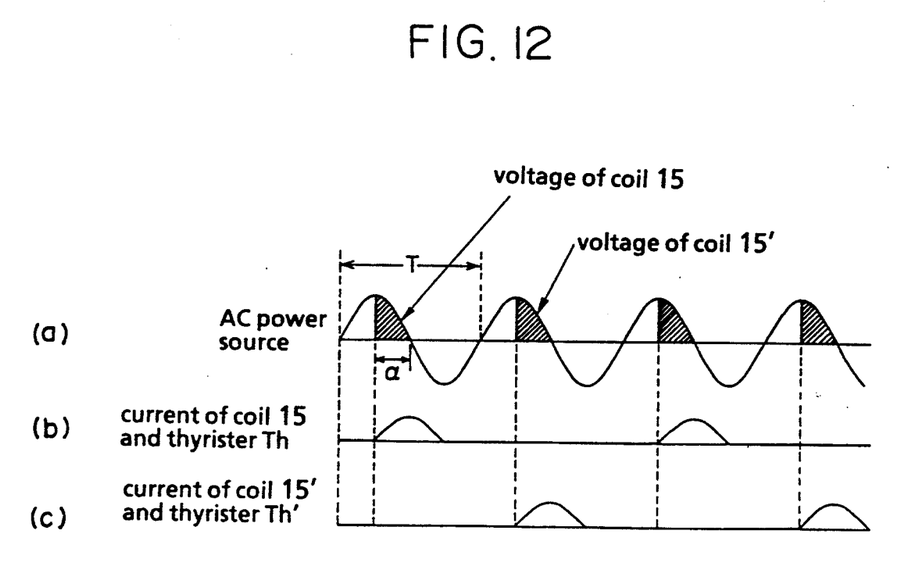
FIG. 12 is a waveform view of a voltage and a current flowing to a coil.

The movable core 12 is attracted by the one of the fixed cores 15 or 15' into which the current flows, and it repeats one reciprocation for every two periods of the power source.

Amplitude adjustment of the trough directly connected to the movable core is accomplished by changing the operating signal voltage to control the conduction angle of a thyristor and changing the current of the coil.

The electromagnetic vibrating apparatus according to the present invention can be utilized for an electromagnetic feeder used to convey materials or an electromagnetic screen used to sieve out materials.

We claim:

1. An electromagnetic vibrating apparatus for vibrating an object, comprising a linearly movable core secured to one of two masses connected by a resilient member, two fixed cores secured to the other mass so that said fixed cores are positioned on opposite sides of said movable core in the direction of linear movement of said movable core, two exciting coils wound about said two fixed cores, and a control circuit for alternately applying a phase-controlled current to said exciting coils, the mass to which said movable core is secured being connected to the object to be vibrated, and further comprising an adjustable stud arrangement extending through said first core for coupling said third core to said vibratory fitting, said first core being between said vibratory fitting and third core in said direction.

2. An electromagnetic vibrating apparatus for vibrating an object, comprising a linearly movable core secured to one of two masses connected by a resilient member, two fixed cores secured to the other mass so that said fixed cores are positioned on opposite sides of said movable core in the direction of linear movement of said movable core, two exciting coils wound about said two fixed cores, and a control circuit for alternately applying a phase-controlled current to said exciting coils, the mass to which said movable core is secured being connected to the object to be vibrated, and further comprising spring means for resiliently holding said third core spaced from said first and second cores.

3. The electromagnetic vibrating apparatus of claim 2 wherein said spring means are coupled to said vibratory fitting.

4. An electromagnetic vibrating apparatus for vibrating an object, comprising a linearly movable core secured to one of two masses connected by a resilient member, two fixed cores secured to the other mass so that said fixed cores are positioned on opposite sides of said movable core in the direction of linear movement of said movable core, two exciting coils wound about said two fixed cores, and a control circuit for alternately applying a phase-controlled current to said exciting coils, the mass to which said movable core is secured being connected to the object to be vibrated, and further comprising a frame, and means for adjustably mounting said first and second cores to said frame.

5. An electromagnetic vibrating apparatus for vibrating an object, comprising a linearly movable core secured to one of two masses connected by a resilient member, two fixed cores secured to the other mass so that said fixed cores are positioned on opposite sides of said movable core in the direction of linear movement of said movable core, two exciting coils wound about said two fixed cores, and a control circuit for alternately applying a phase-controlled current to said exciting coils, the mass to which said movable core is secured being connected to the object to be vibrated, wherein said energizing means comprises means for adjusting the phase of energization applied to said coils.

* * * * *